No. 776,142. PATENTED NOV. 29, 1904.
C. E. METCALF.
BOBBIN CLUTCHING MEANS FOR SPINNING SPINDLES.
APPLICATION FILED OCT. 3, 1904.
NO MODEL.
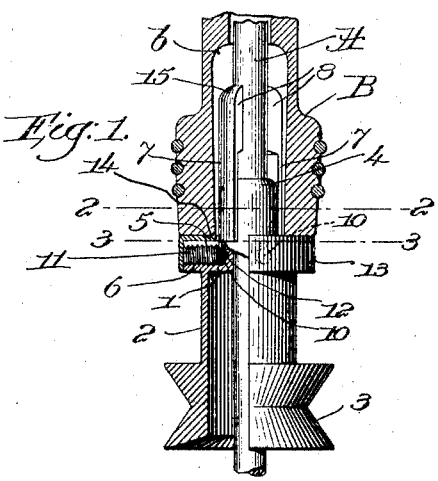
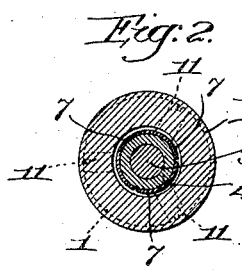 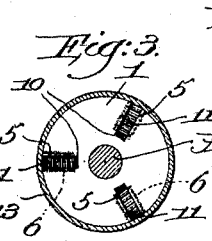 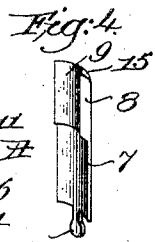 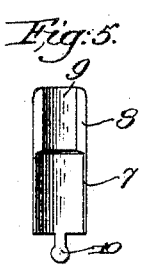
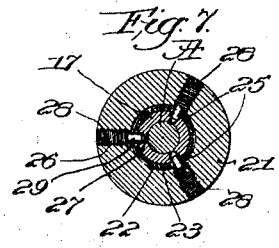 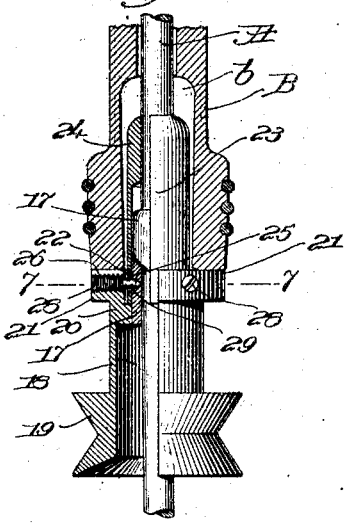 
Witnesses,
Edward H. Allen.
S. Wm. Lutton.
Inventor,
Clarence E. Metcalf,
by Charles Gregory No. 776,142.　　　　　　　　　　　　　　　　　　　　Patented November 29, 1904.

UNITED STATES PATENT OFFICE.

CLARENCE E. METCALF, OF HOPEDALE, MASSACHUSETTS, ASSIGNOR TO SAWYER SPINDLE COMPANY, A CORPORATION OF MAINE.

BOBBIN-CLUTCHING MEANS FOR SPINNING-SPINDLES.

SPECIFICATION forming part of Letters Patent No. 776,142, dated November 29, 1904.

Application filed October 3, 1904. Serial No. 226,884. (No model.)

*To all whom it may concern:*

Be it known that I, CLARENCE E. METCALF, a citizen of the United States, and a resident of Hopedale, county of Worcester, State of Massachusetts, have invented an Improvement in Bobbin-Clutching Means for Spinning-Spindles, of which the following description, in connection with the accompanying drawings, is a specification, like characters on the drawings representing like parts.

This invention has for its object the production of novel means for clutching and retaining a yarn-receiver or bobbin in position upon a spinning, twisting, or other rotatable spindle whereby the bobbin will be rotated simultaneously with the spindle.

My invention relates particularly to that type of retaining means wherein the bobbin is engaged and held by centrifugally-acting clutch members which are mounted on and rotated bodily with the spindle.

The various novel features of the invention will be fully described in the subjoined specification and particularly pointed out in the following claims.

Figure 1 is a half-elevation and longitudinal section of clutching means embodying one form of my invention applied to a rotatable spindle with a bobbin in section shown in position, one of the clutching members being omitted. Fig. 2 is a transverse section on the line 2 2, Fig. 1, looking down. Fig. 3 is a similar view on the line 3 3, Fig. 1. Fig. 4 is a perspective view, and Fig. 5 is an inner face view, of one of the clutching members detached. Fig. 6 is a view, somewhat similar to Fig. 1, of a modified form of my invention, one of the clutching members being broken out and in section. Fig. 7 is a transverse section on the line 7 7, Fig. 6, to show the means for retaining the clutching members in place; and Fig 8 is an inner face view of one of the clutching members shown in Fig. 6.

Referring to Fig. 1, the rotatable spindle A is provided with an annular rest 1, having an attached depending sleeve 2, terminating in a whirl 3, by or through which rotation of the spindle is effected in a manner well known to those skilled in the art. Above the rest the spindle is enlarged at 4, and the rest 1 is provided with radial retaining-sockets, shown as straight grooves 5 opening along their bottoms into threaded holes 6 of greater diameter than the width of the grooves. (See Figs. 1 and 3.) Three of the sockets are herein shown symmetrically disposed around the spindle. A like number of centrifugally-acting bobbin-clutching members 7 are mounted on the rest and surround loosely the spindle, each member having its upper end or head thickened at its inner face at 8 and longitudinally recessed at 9, Figs. 4 and 5, to loosely embrace the spindle. The main portions or bodies are thin and segmental in cross-section and surround the spindle enlargement 4. (See Fig. 1.) The inward projection of the weighted heads 8 tends to move the upper ends of said members toward the spindle when the latter is at rest; but when the spindle is running at speed the centrifugal force tends to spread such heads to engage the inner walls of the chamber $b$ in the head of the bobbin B. (Shown in Fig. 1.)

Each clutching member has at its lower end a depending foot 10, Figs. 4 and 5, comprising a substantially circular portion and a straight neck connecting it with the member, the shape of the foot corresponding to the cross-section of a retaining-socket in the rest 1. The feet are inserted in the sockets, as shown in Fig. 1, and to prevent them from turning and then flying out locking-screws 11 are screwed into the holes 6 until their inner ends bear lightly against the broad portions of the feet 10. The clutching members are thus positively connected with or locked onto the rest 1, which latter also serves to sustain vertically the bobbin, while their heads are permitted to move radially.

A piece of felt or other soft fabric 12, Fig. 1, may be inserted in each socket between the foot of the clutching member and the inner end of the threaded part 6 of the socket to retain lubricant and also serving as a cushion to prevent improper jarring of the clutching member.

To limit outward radial movement of the clutching members, a metal band 13 is forced over the periphery of the rest 1 and provided with an inturned annular flange 14 at its upper end to loosely surround the members 7 just above the top of the rest and limiting by its internal circumference the centrifugally-induced movement of said members. The ring also covers up the locking-screws, and the grooved portions 5 of the retaining-sockets are covered by the flange 14.

It will be seen that the clutching members are loosely held at their lower ends only, and they are also locked positively onto the annular rest, so that they cannot be disarranged or thrown off by rapid rotation of the spindle.

By tapering the walls of the chamber b toward its lower end the heads of the clutching members are permitted to swing outward farther from the spindle at their upper ends than at their lower ends, thereby acting to prevent any lifting of the bobbin from the rest.

As is usual in devices of this character, the outer faces of the heads are rounded at their upper ends, as at 15, to readily enter the bobbin-chamber.

In the modified construction, Figs. 6 to 8, the spindle A has a sleeve-like enlargement 17, which may be integral therewith, or a separate tubular piece forced thereupon, and the sleeve 18 of the whirl 19 is thickened at its upper end, at 20, Fig. 6, to be forced tightly upon the enlargement 17. The upper end of the sleeve 18 is also laterally enlarged to form an annular rest 21, which serves to support the bobbin B, the rest having an annular socket 22 adjacent and concentric with the spindle enlargement 17. Bobbin-clutching members 23, segmental in cross-section, are thickened at their head portions, as at 24, substantially as has been previously described, and a hole 25 (clearly shown in Fig. 8) is made in the lower end or foot of each member, the lower ends of said members entering loosely the socketed portion 22 of the rest 21. Radial threaded holes 26 are made in the rest 21, (see Fig. 7,) the ends of the holes being reduced in diameter and entering the enlargement 17, as at 27, Fig. 7, one of such holes being made for each clutching member. When the said members are grouped around the spindle, the holes 25 register with the reduced ends 27 of the threaded holes 26, and locking-screws 28, having unthreaded reduced tips 29, are screwed into the holes 26. The tips 29 enter loosely the holes 25 in the clutching members, thereby locking them positively to the rest 21, while permitting radial movement due to centrifugal force when the spindle is rotated at speed, the locking-screws also laterally spacing the clutching members. The extremities of the screw-tips seat in the holes 27 and effectually obviate any chance disengagement of the clutching members. In this modified construction the outward movement of the said members is controlled by the wall of the socket 22; but, if desired, a flanged ring, such as 13 14, hereinbefore described, may be forced onto the rest 17, covering the screw-heads, the inner circumference of the flange acting to limit outward radial movement of the clutching members.

Having fully described my invention, what I claim as new, and desire to secure by Letters Patent, is—

1. The combination with a rotatable spindle provided with an annular rest, of centrifugally-acting bobbin-clutching members sustained loosely at their lower ends on the rest, each member having its head thickened at its inner face, tending to move the heads toward the spindle, and means coöperating with the lower ends only of said members to positively connect them with the said rest while permitting limited radial movement of their heads.

2. The combination with a rotatable spindle provided with an annular rest, socketed adjacent the spindle, of centrifugally-acting bobbin-clutching members having their lower ends loosely inserted therein, and means on said rest positively coöperating with the lower ends of the clutching members to connect them with the rest while permitting limited radial movement of their heads, each member having its head thickened at its inner face, whereby said heads tend to move toward the spindle.

3. The combination with a rotatable spindle provided with an annular rest, socketed adjacent the spindle, of centrifugally-acting bobbin-clutching members having their lower ends loosely inserted therein, each member having an inwardly-projecting, thickened head longitudinally recessed to loosely embrace the spindle, and radially-positioned means on the said rest to coöperate with the lower ends of said members, to positively and loosely connect them with the rest.

4. The combination with a rotatable spindle provided with an annular rest, adapted to vertically support a bobbin, and socketed adjacent the spindle, of centrifugally-acting bobbin-clutching members having their lower ends loosely mounted in such socketed portion, and means to lock positively the lower ends of said members therein.

5. The combination with a rotatable spindle provided with an annular rest, socketed adjacent the spindle, of centrifugally-acting bobbin-clutching members having their lower ends loosely inserted therein, and locking-screws mounted in the rest to coöperate with the lower ends of said clutching members and positively lock them in operative position.

6. The combination with a rotatable spindle provided with an annular rest, having a plurality of radial retaining-sockets, of centrifugally-acting bobbin-clutching members each having a foot to enter loosely the sockets, and means on the said rest to engage the feet and lock them in the sockets.

7. The combination with a rotatable spindle provided with an annular rest, of centrifugally-acting bobbin-clutching members sustained loosely at their lower ends on the rest, means coöperating with the lower ends of said members to lock the same positively on the rest, and separate means to limit outward radial movement of said members.

In testimony whereof I have signed my name to this specification in the presence of two subscribing witnesses.

CLARENCE E. METCALF.

Witnesses:
GEORGE OTIS DRAPER,
ERNEST W. WOOD.